US006871341B1

(12) United States Patent
Shyr

(10) Patent No.: US 6,871,341 B1
(45) Date of Patent: Mar. 22, 2005

(54) ADAPTIVE SCHEDULING OF FUNCTION CELLS IN DYNAMIC RECONFIGURABLE LOGIC

(75) Inventor: Jin-sheng Shyr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/534,956

(22) Filed: Mar. 24, 2000

(51) Int. Cl.[7] ............................................. G06F 9/44
(52) U.S. Cl. .................... 717/131; 717/141; 712/227
(58) Field of Search ............................ 717/131–151; 712/227, 13–17; 710/4

(56) References Cited

U.S. PATENT DOCUMENTS 5,881,311 A * 3/1999 Woods ........................... 710/4
5,909,567 A * 6/1999 Novak et al. ................ 712/208
6,009,531 A * 12/1999 Selvidge et al. ............. 713/400
6,263,302 B1 * 7/2001 Hellestrand et al. .......... 703/17

* cited by examiner

Primary Examiner—Tuan Dam
Assistant Examiner—Chuck Kendall
(74) Attorney, Agent, or Firm—Michael A. Proksch

(57) ABSTRACT

Embodiments of adaptive scheduling of function calls in dynamic reconfiguration logic are generally disclosed herein. In this regard, accordance with but one example embodiment, a method of scheduling function calls in a software program in a dynamically reconfigurable computing system which includes an embedded processor and a finite number of reconfigurable logic partitions which are each programmed by a set of configuration bits dynamically loaded into the system's configuration memory is disclosed.

33 Claims, 10 Drawing Sheets

Incremental Tasking Sequence in Scheduling

Normal Tasking Sequence in Scheduling

ADAPTIVE SCHEDULING OF FUNCTION CELLS IN DYNAMIC RECONFIGURABLE LOGIC

BACKGROUND OF THE INVENTION

1. Field of the Invention

The present invention relates to hardware acceleration of software code in a dynamic reconfigurable computing systems.

2. State of the Art

The execution of a computer software program may be accelerated by converting sections of the software code that are most frequently executed into Function Calls that are implemented or assisted in hardware. Traditionally, the partitioning of total system logic into separate hardware and software portions for respective implementations is determined early in the architecture design stage. However, implementing application specific logic in hardware can be time-consuming and expansive. As a result, hardware acceleration has been limited to cases that are generic and obvious.

Moreover, a majority of software programs are written in high-level program languages, such as C and Java. These programs are translated via a compiler into machine instructions targeted for a specific processor. Because of this isolation of software programming from target processor architecture, opportunities for hardware acceleration specific to a software program are traditionally not materialized.

With Dynamic Reconfigurable Logic, such as described in U.S. Pat. No. 5,970,254 entitled "An Integrated Processor and Programmable Data Path Chip for Reconfigurable Computing," the above-mentioned acceleration opportunities can be easily and economically materialized. A method as such is described in U.S. Pat. No. 5,966,534 entitled "Method for Compiling High Level Programming Languages into an Integrated Processor with Reconfigurable Logic." Pertaining to this method, a software program is analyzed by a software tool, known as profiler, to target the most frequently executed codes for hardware acceleration. Code segments thus identified, known as Hard Functions, are extracted and implemented in Reconfigurable Logic via a series of transformation and logic synthesis tools to generate Configuration Bits which configure the Reconfigurable Logic Hardware to perform the exact functions of the original code segments are generated.

A reconfigurable system may consist of multiple reconfigurable hardware units, known as Fabric Partitions, each can be programmed independently. When necessary, more than one partition may be "chained" together to accommodate a given Hard Function. To execute a Hard Function, its Configuration Bits must be pre-stored in a designated on-chip memory area, known as Configuration Memory. The Configuration Memory may retain one active entry, called Active Plane, plus several Shadow entries, called Docking Planes, of Configuration Bits. The Docking Planes provide concurrent loading of Configuration Bits for Hard Functions that are to be executed next, in the background while the Fabric Partition is executing off the Active Plane. When a Fabric Partition concludes executing the current Active Plan, the contents of any one of the Docking Planes can be transferred to the Active Plane and then be activated (for execution) instantly. It is essential that the Hard Function to be executed has its Configuration Bits pre-fetched to a Docking Plane, or else, the system would be idle while waiting for the Configuration Bits to arrive, causing system throughput to suffer. To a degree, this problem can be partially answered by having the execution flow of the software program analyzed to determine the point of pre-fetching for each Hard Function. However, in general, there are more sets of Configuration Bit candidates for pre-fetching than there are Docking Planes. Consequently, it becomes necessary to choose, perhaps based on benchmark statistics, the best candidates to pre-fetch. Yet, the best choices are not always obvious, the reasons are:

1. Best choices are, more likely than not, sensitive to real-time input data streams. Static scheduling, as described above, is likely misled by average values. For example, a function called following an event 100% of the time over half of the runtime and occurring 0% over the other half would show a 50% chance of being called after the event. This would imply a fixed 50% schedule miss, even though zero miss could be easily achieved.
2. Hardware acceleration does not always produce better throughput. If a function stays active only briefly, it can't justify the overhead incurred in pre-fetching. However, the duration of a function staying active is not generally static.
3. Static scheduling, by default, has to be conservative. Borderline cases would have to be discarded, performance gain opportunities may not be fully realized.

With dynamic reconfiguration capability in the system, code segments identified as Function Calls can be thought of as having all their Configuration Bits kept in unlimited numbers of Virtual Programmable Logic Fabric Partitions (or simply, Virtual Partitions). Virtual Partitions are kept in secondary storage areas and are fetched into real Fabric Partitions just in time for execution. The scheme, in concept, is similar to a Virtual Memory popular in computer architectures. As a result, more code can thus be serviced for hardware acceleration in this virtual environment. A method that supports the storage organization needed for Virtual Partitions is described in Attorney docket No. 032001-008 entitled "An On-chip Memory Architecture and Design Methodology Supporting the Conversion of High Level Source Code into Reconfigurable Logic Gates."

Although similar in concept, Virtual Partitions require a scheduling algorithm that differs significantly to that of a Virtual Memory. A virtual memory segment is fetched into real memory space based on a scheme called demand paging. That is, in essence, the fetching of memory content from virtual space to real is triggered by its absence when addressed. But, when that happens, the system fetches data on a wholesale basis, that is, not just the data items, but a whole block of memory containing those items. This scheme is effective for virtual memory because memory usage tends to be localized. Such locality cannot be assumed with Virtual Partition. As a result, fetching of Virtual Partitions must be scheduled in advance.

The purpose of scheduling is to optimize the usage of the real Fabric Partitions for maximal performance gain. A method of such scheduling is described in U.S. Pat. No. 5,966,534 entitled "Method for Compiling High Level Programming Languages into an Integrated Processor with Reconfigurable Logic." In this method, scheduling instructions are explicitly inserted into software program code. In other words, the scheduling is static even though Hard Functions are called dynamically, sensitive to input data streams. The advantage of a static scheduling method as this one is in its simplicity. However, performance penalty incurred with a schedule miss is so excessive, scheduling has to be on the conservative side in this method. As a result, the potential of hardware acceleration may not be fully achieved.

The present invention comprises a generalized scheduling method, in which scheduling of Configuration Bits prefetching is dynamic and adaptive to real-time execution patterns. This method improves system throughput by minimizing both schedule misses and the penalty incurred with a schedule miss. In addition, user interactions with the system is simplified. Finally, in a Training Mode included in the present invention, a software program can "train" its scheduling to become more and more effective, learning from real-time samples, and thus, eliminate some of the preprocessing steps that would otherwise be needed to establish an elaborated data base on which the scheduling is based.

SUMMARY OF THE INVENTION

The present invention, in general, is a system and method for dynamic scheduling of Hard Functions (i.e., code segments which are targeted and prepared for hardware execution in a software program) for execution in a Reconfigurable Logic Fabric Partition of a reconfigurable computing system. Accordingly, the scheduling method is:

- dynamic—the schedule is re-evaluated each time a Hard Function is invoked,
- heuristic—scheduling is based on heuristic figures of merits formulated upon the statistics kept with a Call History Model, and
- adaptive—the statistics kept in the Call History Model are adjusted based on recent call pattern observed in real-time.

In a first aspect of the present invention, prior to execution of a software program, code segments identified as Hard Functions are implemented for: (a) Soft Execution and (b) Hard Execution. In the former case, the function is compiled to be executed wholly in the system's embedded processor. In the latter case, the function is compiled to have portions of the code, marked for hardware acceleration, executed outside of the embedded processor and in Reconfigurable Logic. Meanwhile, each section of code marked for hardware acceleration is transcribed to its functional equivalence in logic in the form of Configuration Bits. The Configuration Bits stored in the Configuration Memory can configure the Reconfigurable Logic to perform the exact function of the section of code they were transcribed from. With this duality in implementation the system can invoke software execution as an alternative, in case the Configuration Bits associated with a function is not readily in place for execution when the function is called. As the result, the system will never have to stall.

In a second aspect of the present invention, a hierarchy of memory storage devices with incremental access latency is employed to stage the Configuration Bits of individual Hard Functions to arrive at the Configuration Memory in time when a function is called. This hierarchy may include any combination among a wide range of memory storage devices, such as ROM, hard disk, dedicated area of main memory, dedicated SRAM used as Configuration Buffer, on-chip memory used as Configuration Cache, etc. These devices mimic Configuration Memory and extend real Reconfigurable Logic Hardware into virtually an unlimited number of Virtual Partitions. The Configuration Bits from each Hard Function in a software program is assigned to a Virtual Partition. Initially, all Virtual Partitions are stored in a non-volatile device, e.g. disk. Over time, they are copied over up the ladder of the staging hierarchy, in pace with its estimated time of need. Optimally, a given Virtual Partition needs to be in a stage where the composite latency is within its estimated time of need. By the same token, a Virtual Partition can be retracted from a stage where its estimated time of need falls behind the composite latency of the previous stage. In this way, a Virtual Partition is assured to be within reach for the Hard Execution, but not tying up resources prematurely. In cases when the number of Virtual Partitions asserted to be at a certain stage exceeds the capacity of that stage device, priority is asserted based on the calculation of expected performance gain on individual Virtual Partitions.

In a third aspect of the present invention, a Call History Model of Hard Function Calls in a software program is established for the basis of scheduling. In the Model, each call-site of a Hard Function is included as a Function Call. Associated with each Function Call is a list of probable next-calls, which track the call history following this call. In the present invention, an adaptive method is used to trace all history instead of the prior art pre-processing analysis technique of establishing call history. The basis of the adaptive method is founded on duality in implementation and because a schedule miss is not as detrimental as it would be otherwise. This allows the system to learn from its previous hits and misses dynamically. Also included in the Call History Model is statistical data reflecting the execution trends of a Function Call, in terms of frequency of use, performance gain, and execution duration. The statistical data is used to estimate time of need and expected gain for the staging of Virtual Partitions.

In a fourth aspect of the present invention, scheduling of Hard Function Calls is adaptive to the real-time call pattern of the application. At the start-up time for a given software program, an initial Call History Model is loaded so as to start up the staging process of Virtual Partitions. The initial Call History Model can be one constructed by a pre-processor analyzing benchmark input data. Alternatively, the Call History Model can be saved from a previous run. The statistical content of the Model can then be updated dynamically, coincident upon actual activation of Function Calls in an application. The method also includes heuristics that fine-tune the scheduling processes. For instance, probabilities associated with next-calls are adjusted dynamically, where the weight of adjustment can itself be adjusted empirically.

In a fifth aspect of the present invention, a Demand Look-Ahead scheme is devised to look for Virtual Partitions that will be needed several steps ahead. For instance, a current call $F_A$ may be followed by a call $F_B$ 50% of the time and a call $F_C$ 50% of the time, while $F_B$ and $F_C$ are both followed by call $F_D$ 100% of the time. This makes call $F_D$ a sure bid one call remote from the current call $F_A$. In this aspect, the system traverses the next-calls lists several levels down to obtain a snapshot of the composite demands of all Virtual Partitions, then positions them in the staging hierarchy accordingly. Although copying Virtual Partitions from place to place increases system activities, those activities are done in the background and thus present no impact to system throughput.

In a sixth aspect of the present invention, the system optionally includes a Training Mode in which the system starts up without an initial Call History Model and constructs such a Model on-the-fly. The adaptive nature of the present invention makes the self-training possible, and thus simplifies user interaction with the system.

BRIEF DESCRIPTION OF THE DRAWINGS

The present invention may be further understood from the following written description in conjunction with the appended drawings. In the drawings.

DETAILED DESCRIPTION OF THE PREFERRED EMBODIMENTS

Figure 1:
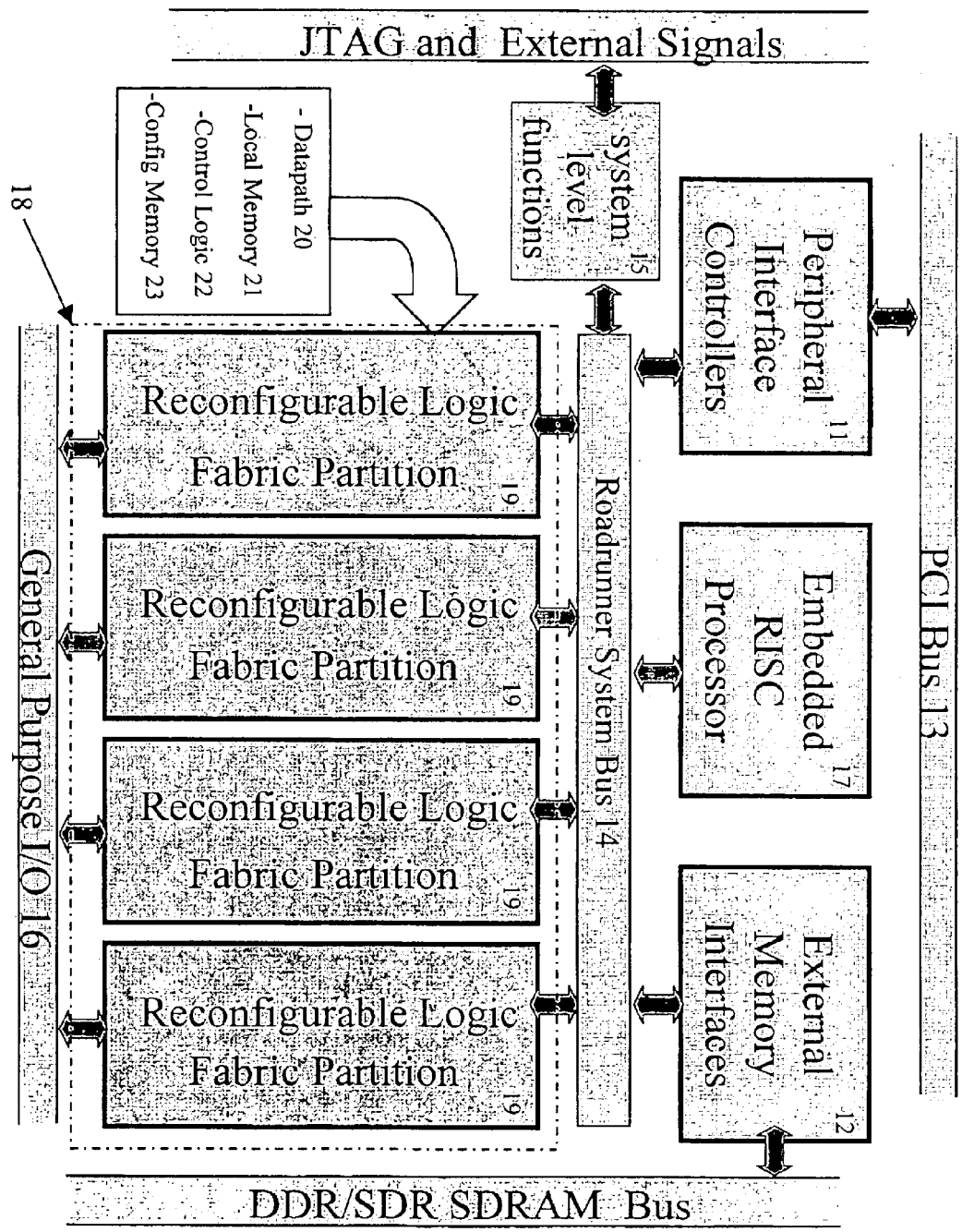
FIG. 1 shows an overview of an exemplary Reconfigurable Logic Fabric.

In accordance with an exemplary embodiment of the present invention, given a program source code written in a high level language such as C-language, each code segment identified for hardware acceleration is handled as a Hard Function. A computer implemented behavior synthesis method (described in U.S. Pat. No. 5,970,254 referenced above) is then used to implement each Hard Function in hardware suitable for the Reconfigurable Logic Hardware (described in U.S. Pat. No. 5,970,254 referenced above). An overview of an exemplary system 10 including Reconfigurable Logic Fabric is shown in FIG. 1. In general, the system includes typical processing system elements such as a peripheral interface controller 11, the external memory interface 12, a PCI bus 13, a system bus 14, system level function elements 15 and general purpose I/O 16. The system further includes an embedded processor 17 and a Reconfigurable Logic Fabric 18 including a plurality of Fabric Partitions 19. Each Fabric Partition may be implemented to have an associated data path portion 20, local memory portion 21, central logic 22, and Configuration Memory 23 as shown in FIG. 1. In one embodiment, the data portion is made up of a plurality of programmable multifunction datapath units (DPUs), not shown, as described in U.S. patent application Ser. No. 09/307,072, filed May 7, 1999.

In prior art techniques, a Hard Function is identified and extracted from the software program on a boundary that coincides with the reconfigurable hardware. With the present invention, this restriction is removed; a Hard Function is situated on its natural functional boundary, which means a Hard Function may glue together one or more Fabric Calls (sub-units that observe hardware boundary) as one functional entity. In other words, a Hard Function, no matter how many calls it transfers to hardware, is to be compiled, optimized and scheduled together as one unit.

Figure 2:
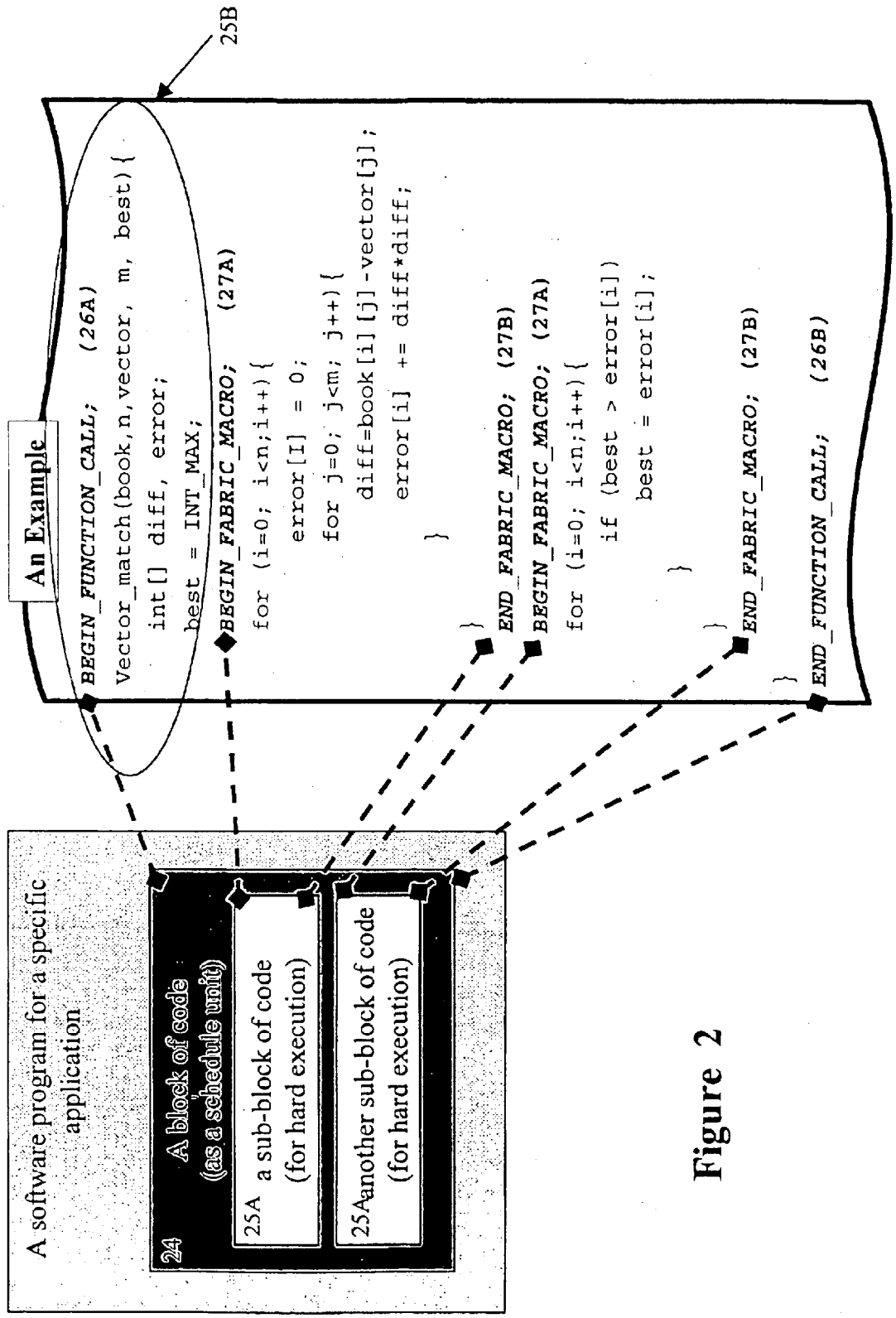
FIG. 2 shows the general structure of a Function Call.

A Hard Function, like a software subroutine, may be invoked from multiple call-sites in a software program. Each call-site is dealt with uniquely as a Function Call. Even though multiple Function Calls of a given Hard Function involve the same set of Fabric Calls, the data communication surrounding the calls may not be identical. Distinguishing between each Function Call has the advantage of allowing a compiler to streamline data traffic locally. However, the distinction between a Hard Function and a Function Call is, in fact, an artificial one, and hence we will herein use the two terms indiscriminately. As shown in FIG. 2, a Function Call 24 is composed of one or more Fabric Calls 25A, surrounded by code that directs the data traffic to and from the Fabric Calls. For instance, FIG. 2 shows code 25B outside of each Fabric Call code. All Function Calls invoking the same Hard Function employ the same set of Fabric Calls.

When a software program source code is compiled by a compiler customized for the present invention, each Function Call is compiled with dual implementation, a Soft implementation and a Hard implementation. Firstly, in a Soft implementation path, the whole function is compiled for execution in the embedded processor 17 (FIG. 1) as if Fabric Call boundaries don't exist. Secondly, in a Hard implementation path, Fabric Calls are replaced by code that transfers the execution of Fabric Calls to hardware by activating the corresponding Configuration Bits. In parallel of the software program, each Fabric Call is also synthesized by a synthesis tool to generate the corresponding Configuration Bits. For instance, the code between the beginning and ending Fabric Call Statements are converted into a known hardware description language such as RTL or HDL. A behavioral synthesis tool such as described in U.S. patent application Ser. No. 09/307,174 then converts the hardware description language into the corresponding Configuration Bits. Finally, both Soft and Hard implementations are assembled together to allow alternate branching to invoke either or both of the implementations subject to runtime conditions or options.

There are three-fold objectives with this duality in implementation. First of all, the software program can continue executing the Soft implementation, without having to wait for miss-scheduled Configuration Bits. Secondly, it facilitates the verification of the Hard implementation against the Soft implementation, since both of them can be invoked in parallel and have their results compared at the end. Thirdly, it allows the system to self-tune its scheduling for Function Calls, adaptive to the incoming data stream, to maximize system throughput.

Figure 3:
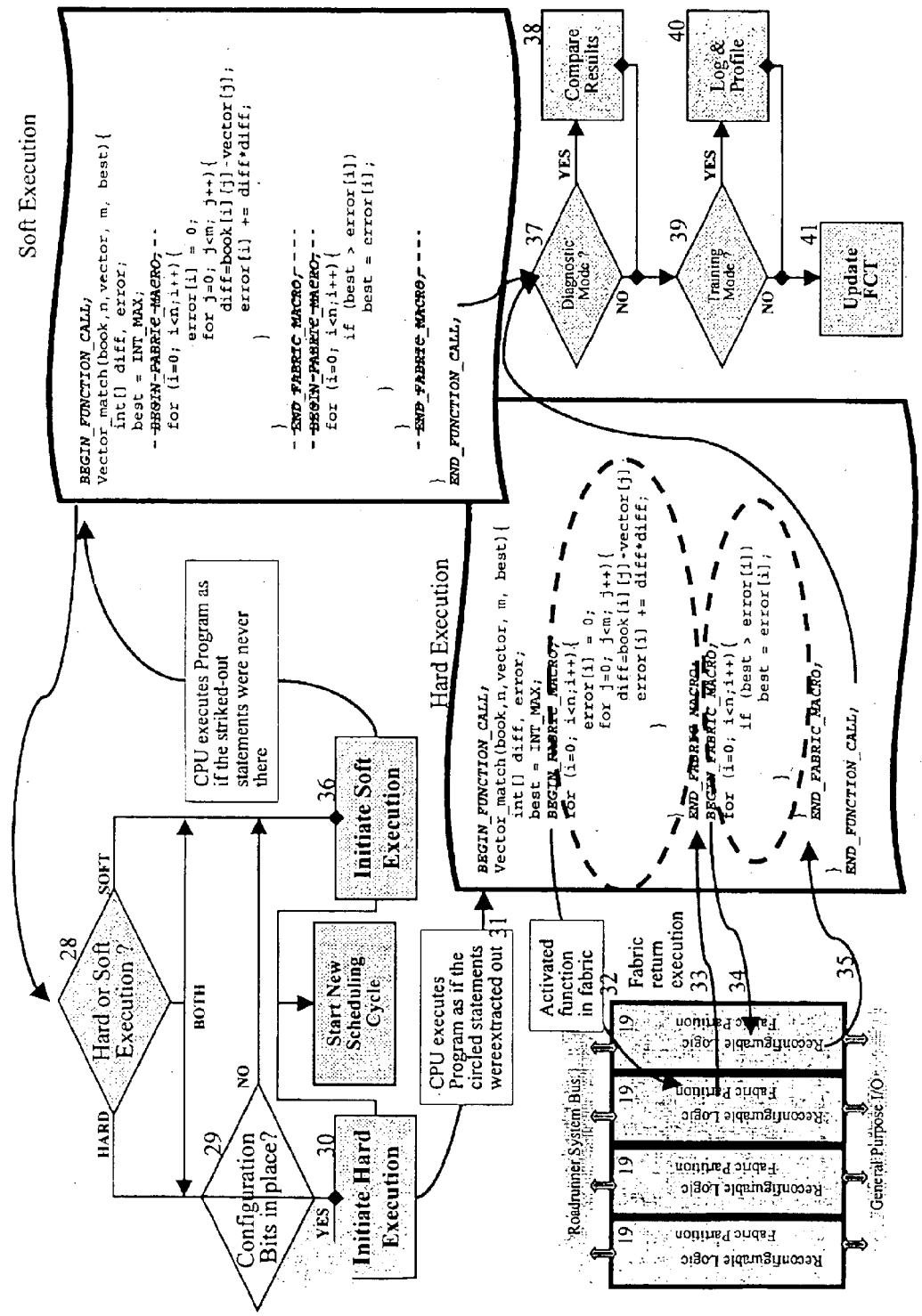
FIG. 3 shows the activation flow of a Function Call.

FIG. 3 shows a flowchart illustrating the Activation Flow of a Function Call and the concept of duality in implementation. FIG. 3 shows that when each Fabric Call Statement is encountered in the software program, a scheduling decision (28) is made as to whether it will be a Hard Execution or Soft Execution. If the configuration bits are in place (29) (i.e., loaded into the memory areas as will be described herein below), Hard Execution is initiated (30). The CPU executes the program (31) and, when it encounters a BEGIN_FABRIC_MACRO statement, the Fabric Partitions (19) are used to perform the Hard Execution and then return to the software program at the end of each macro to continue the flow of the Function Call as executed by the CPU (32–35). If the scheduling decision (28) determines that a Soft Execution should be performed, or if the Configuration Bits are not in place (29), Soft Execution is initiated (36). In this case the BEGIN_FABRIC_MACRO and the END_FABRIC_MACRO statements are ignored and the code between these statements are executed by the embedded processor. In one embodiment during a diagnostic mode (37), both of the Soft and Hard Executions are performed after which the statistical data is compared.

Expanded from the self-tuning aspect, in one embodiment of the present invention, a Training Mode (39) can be included to bring a software program up cold, starting out all Function Calls in Soft Executions, but gradually switching to Hard Executions for ones that are found having the most impact to system throughput. In this case, if the system is in Training Mode (39) statistical data is logged and a statistical profile (40) is developed for each Function Call.

No matter which mode is being implemented, at the end of the execution of a Function Call the Function Call Table (FCT), which includes statistical data relating to the execution of the Function Call is updated (41).

Function Call

FIG. 1 shows a general structure of a Function Call in one embodiment of the present invention. As shown, a Function Call is enclosed by a pair of special statements: a BEGIN-FUNCTION-CALL 26A in the front and an END-FUNCTION-CALL 26B at the end. Within the Function Call, each sub-segment targeted for hardware implementation is enclosed by a second pair of special statements: a BEGIN-FABRIC-MACRO 27A in the front and an END-FABRIC-MACRO 27B at the end. Optionally, a PRELOAD-FABRIC-MACRO statement (not shown) can be used to pre-fetch Fabric Calls in advance of the BEGIN-FABRIC-MACRO statement. Thus, a Function Call, may include portions that are to be converted to hardware and portions that are not, which in its entirety coincides with a natural boundary of the program function. Two advantages are achieved with this Function Call format. First, code changes to a software program are kept minimal to adopt the system and method of the present invention. Second, sections of code can be isolated as Fabric Calls automatically, while having the remaining code optimized for streamlining data traffic and maximizing system throughput. The compiler can invoke special hardware resources, for instance DMA channels, to achieve such optimization.

In one exemplary embodiment, the two enclosing Function Call statements 26A and 26B are translated by the compiler into codes that initiate the system for a sequence of runtime actions, including:

1. Determining whether Hard implementation or Soft implementation of the Function Call is to be activated, or both as in training or diagnostic mode;
2. Initiate special runtime service routines, if in training or diagnostic mode, to track input data, log output data, and compare data resulted from Soft and Hard Executions; and
3. Initiate a sequence of scheduling tasks to update statistics of the Function Calls, look ahead to identify among probable next-calls the most likely candidates to line up for Hard Execution, and "move" their respective Virtual Partitions in a hierarchy of storage devices.

Similarly, the two Fabric Call statements are translated into codes that signal system hardware to activate or deactivate specific Configuration Bits for execution. The system actions of the above special statements are illustrated in FIG. 3.

Virtual Partition

In a reconfigurable computing system, there are a finite number of Fabric Partitions 19 (FIG. 1). Each can be programmed independently, and several consecutive Fabric Partitions may be "chained" to accommodate a particular function. In the present invention, a Virtual Partition cares one real partition worth of Configuration Bits for a Fabric Call, and likewise, several Virtual Partitions may be chained to mirror image the chaining of real fabrics. Virtual Partitions are stored in a persistent and non-volatile storage, such as disk, ROM, etc. There is practically no limit as how many Virtual Partitions there can be, as many as it takes in a software program. The concept of Virtual Partitions is shown in FIG. 4.

Figure 4:
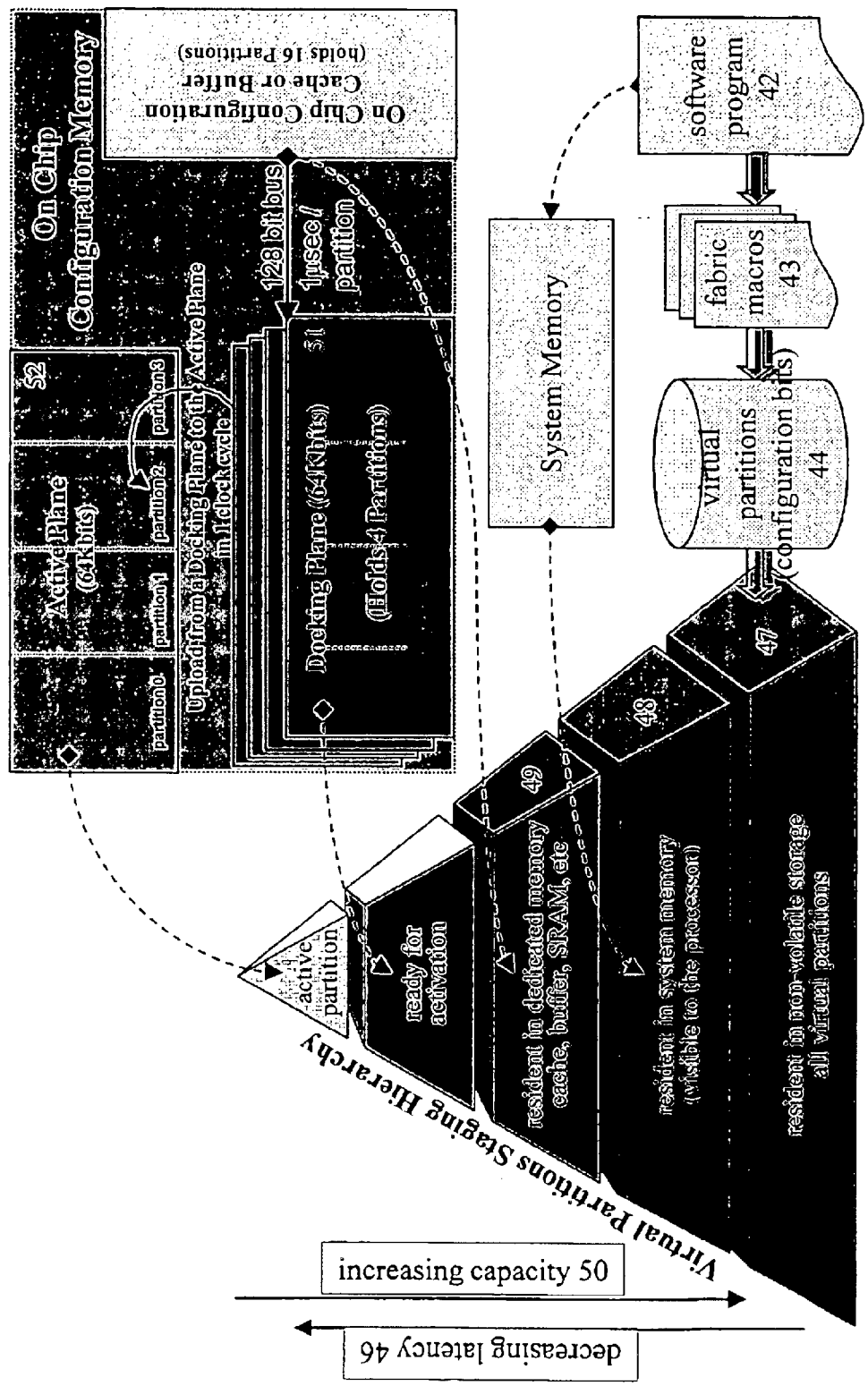
FIG. 4 shows the extension of Fabric Partitions into virtual space.

As shown in FIG. 4, initially a software program 42 is evaluated and Fabric Calls 43 are identified so as to generate the Virtual Partitions 44. The Virtual Partitions are then stored into the Fabric Partition Virtual Space 45.

At runtime, as shown in FIG. 4, the Virtual Partitions are copied through a chain of memory devices to reach the real Fabric Partition 19 for execution the memory devices are represented in FIG. 4 by the Fabric Partition Virtual Space 45. These memory devices are lined up in their order of latencies 46 and provide a pathway that stages the movement of fabric Configuration Bits "just in time" for their execution. In the present invention, this pathway may be made-up of any combination of storage devices, including hard disk 47, system main memory 48, dedicated external SRAM 49, dedicate on-chip buffer memory 49, and on-chip Configuration Cache 49, depending on software program throughput requirements. The general idea is that the slower the access time of the storage device, the greater the storage units (or staging slots) within each level of the Virtual Space Pyramid 45. (see indicator 50). The final stage of the pathway is on the fabric in an area known as the Shadow Configuration Memory, also called Docking Planes 51. Docking planes allow loading of the next-call function in the background while Fabric Partitions are executing current Function Calls from the Active Plane 52.

Figure 5:
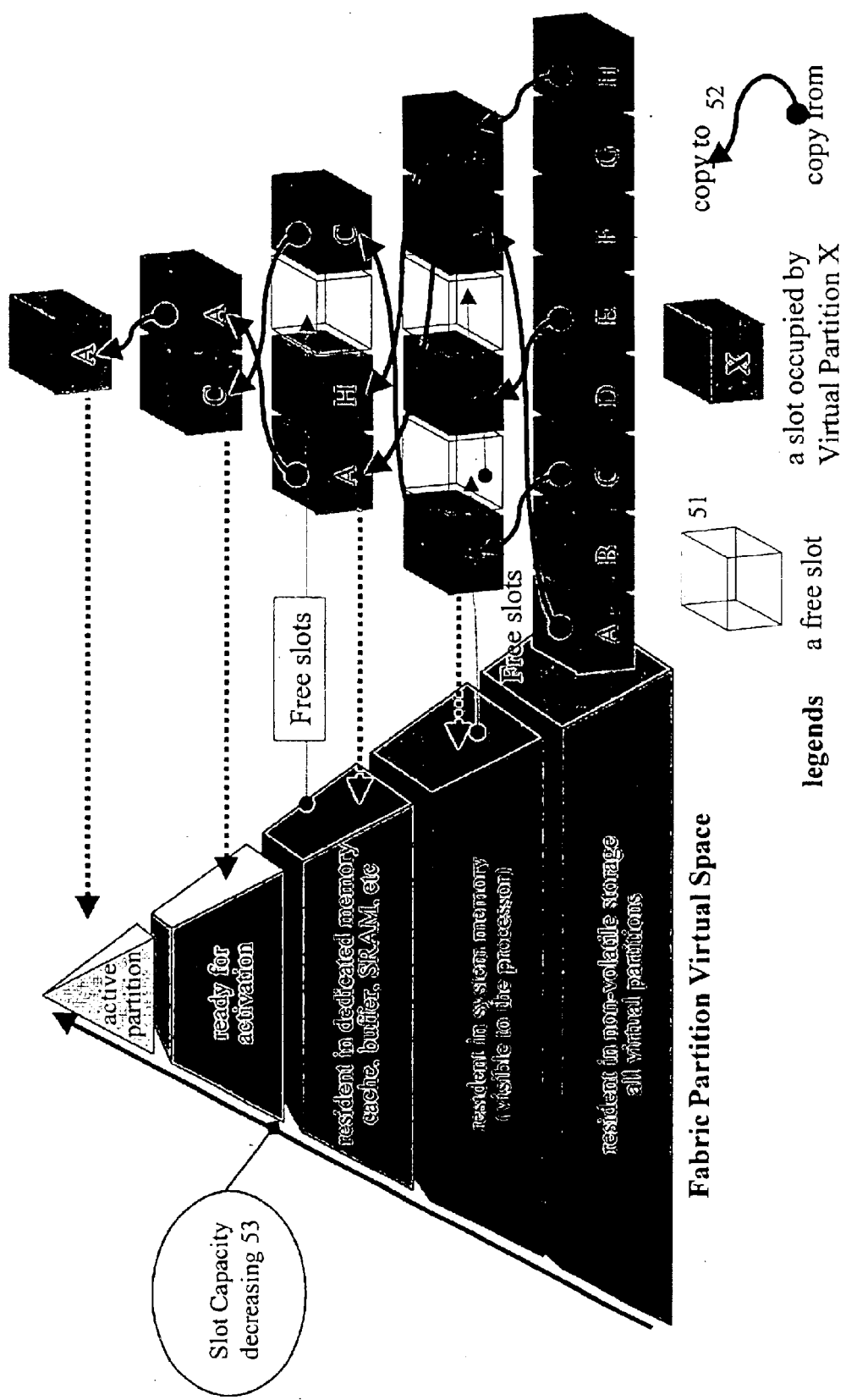
FIG. 5 shows an exemplary staging hierarchy for Virtual Partitions.

Referring to FIG. 5, the memory storage unit within the pyramid taken by a Virtual Partition is called a staging slot. The combined slots of all storage devices in the pathway form the pyramid of staging paths as shown in FIG. 4. Virtual Partitions move up and down the pyramid, based on the urgency of their time of need. A Virtual Partition may occupy a chain of slots across the stage hierarchy. The highest stage at a given instance of the chain is called the rank of the Virtual Partition, and its slot location at that rank is called the position of the Virtual Partition. FIG. 5 shows examples of Virtual Partitions moving within the pyramid. To move a Virtual Partition up a rank in the pyramid, its bit image at the current position is copied over to a free slot 51 in the next rank, while the copy at its current position is left untouched (52). To move a Virtual Partition down a rank, the system simply retracts back to its previous rank and position, and the current slot is recycled.

Under this pyramid structure, a Virtual Partition is given an attribute called stage latency. Stage latency is the composite access times of all devices from current stage to the top of the pyramid. Applying the "just-in-time" principle, the system and method attempt to place a Virtual Partition in a rank such as:

stage latency(rank)<expected time of need<stage latency(rank−1)

Ideally, there would be sufficient staging slots in every hierarchy level of the pathway to keep Virtual Partitions all within reach. In general, slot capacity is less and less to the top (53) and consequently, many Virtual Partitions may compete for available free slots in a given hierarchal stage. When this happens, the system prioritizes the candidate Virtual Partitions in accordance with their expected payback, which reflects the improved throughput that can be expected from Hard Execution. Payback is calculated as the product of the following three factors:

Probability, of getting called next
Hard-Duration, the average duration in Hard Execution
Speed-up, the performance gain factor in Hard vs. Soft Executions Out of the three factors, the first two are re-evaluated dynamically. The third remains static to its initialized value, except in Training Mode. In Training Mode, an option can be set to execute in parallel both Soft and Hard implementations, thus, allowing real-time evaluation of the third factor.

Staging Storage Addressing

Figure 6:
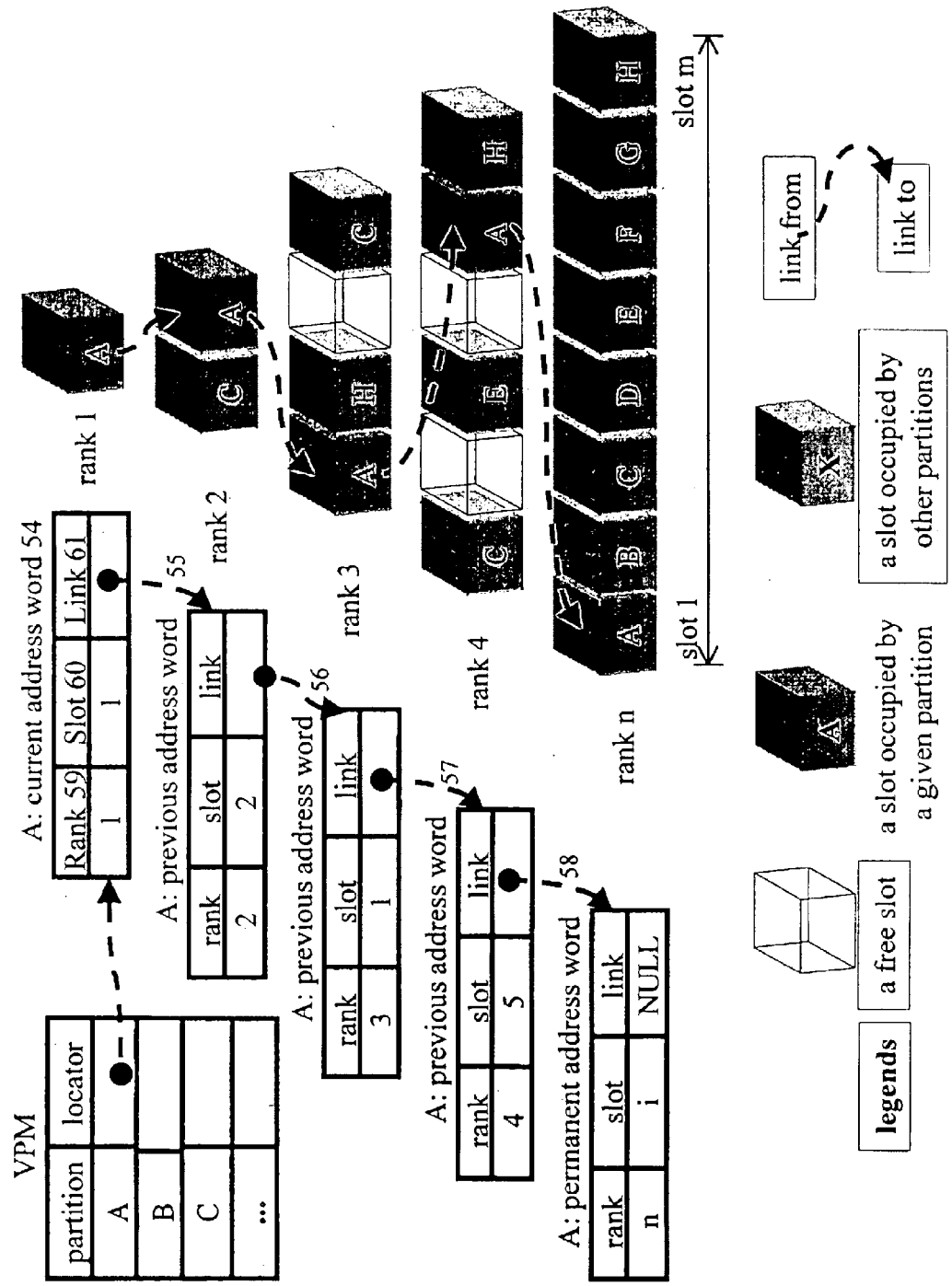
FIG. 6 shows the address scheme for Virtual Partitions.

FIG. 6 shows the addressing and staging dynamics of Virtual Partitions in the pyramid. In an exemplary embodiment of the present invention, the position of a Virtual Partition in the above-mentioned pyramid is locatable using a chain of address words (54–58). An address word, containing rank 59, slot position 60, link 61, and other fields as shown in FIG. 6, uniquely addresses the location of a staging slot where the bit contents of a Virtual Partition is stored. As shown in FIG. 6, one particular field is a pointer 61 linking to its address word at a preceding rank. There is one address word in the system main memory of the pathway for every storage slot in the system. Free slots at each rank are chained together for recycling. Maintained with an address-word are four access-control flags shown in FIG. 8:

Valid indicates the validity of the Configuration Bits copied at the location,
Lock prohibits the recycling of the slot location until it is unlocked,
Park indicates staging end-point; hardware takes over here on, and
Persistent indicates the location is permanent and never reassigned.

With these flags, a wide range of staging storage arrangements can be supported. A given reconfigurable computing system may include on-chip staging resources, e.g. Configuration Buffer shown in FIG. 4, Configuration Cache, and fabric etc., that are directly managed by system hardware. The method described in the present invention is general enough to allow these hardware stages to be either visible or transparent from scheduling. For instance, a Configuration Cache, capable of fetching Configuration Bit data directly from system memory; can have the park flag set so that scheduling stops at the Configuration Cache level and the remainder of the Virtual Partition movement is controlled by hardware. Alternatively, the flag may be set off to allow the scheduling system direct control over its caching algorithm.

Similarly, some or all Virtual Partitions may be preloaded into system memory initially with their persistent flag set. This will guarantee the access latency of these Virtual Partitions can be no worse than the storage device's staging latency in which the Virtual Partition was pre-loaded into.

System Tables

In an exemplary embodiment of the present invention, several system tables are maintained to model and monitor the dynamics of Function Calls; and schedule the staging of their corresponding Virtual Partitions. Among them, the two main ones are the Function Call Table (FCT) and Virtual Partition Map (VPM). Exemplary embodiments of the FCT and VPM are shown in FIG. 7 and FIG. 8 respectively.

Figure 7:
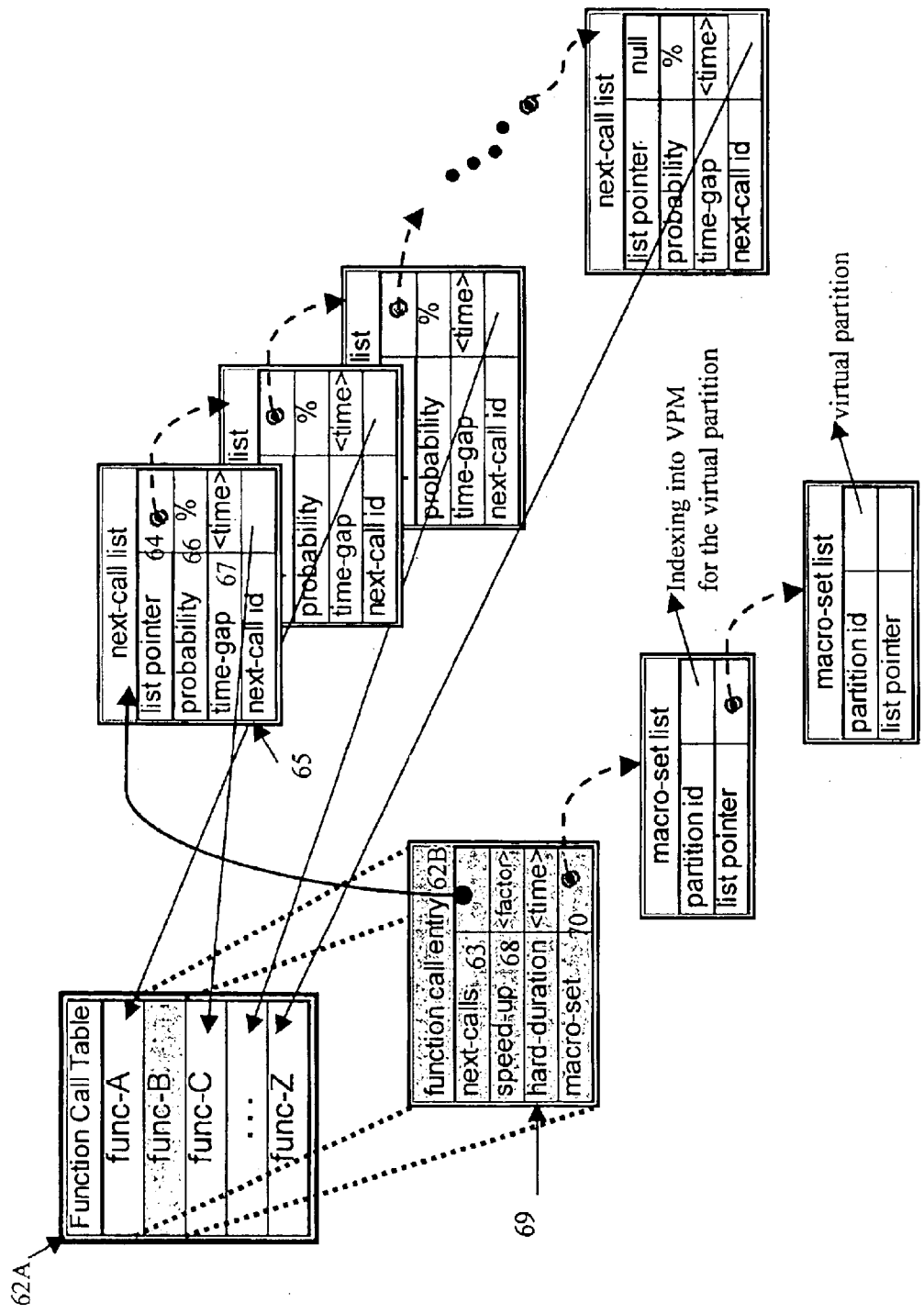
FIG. 7 shows the schematics of a FCT (Function Call Table)
Figure 8:
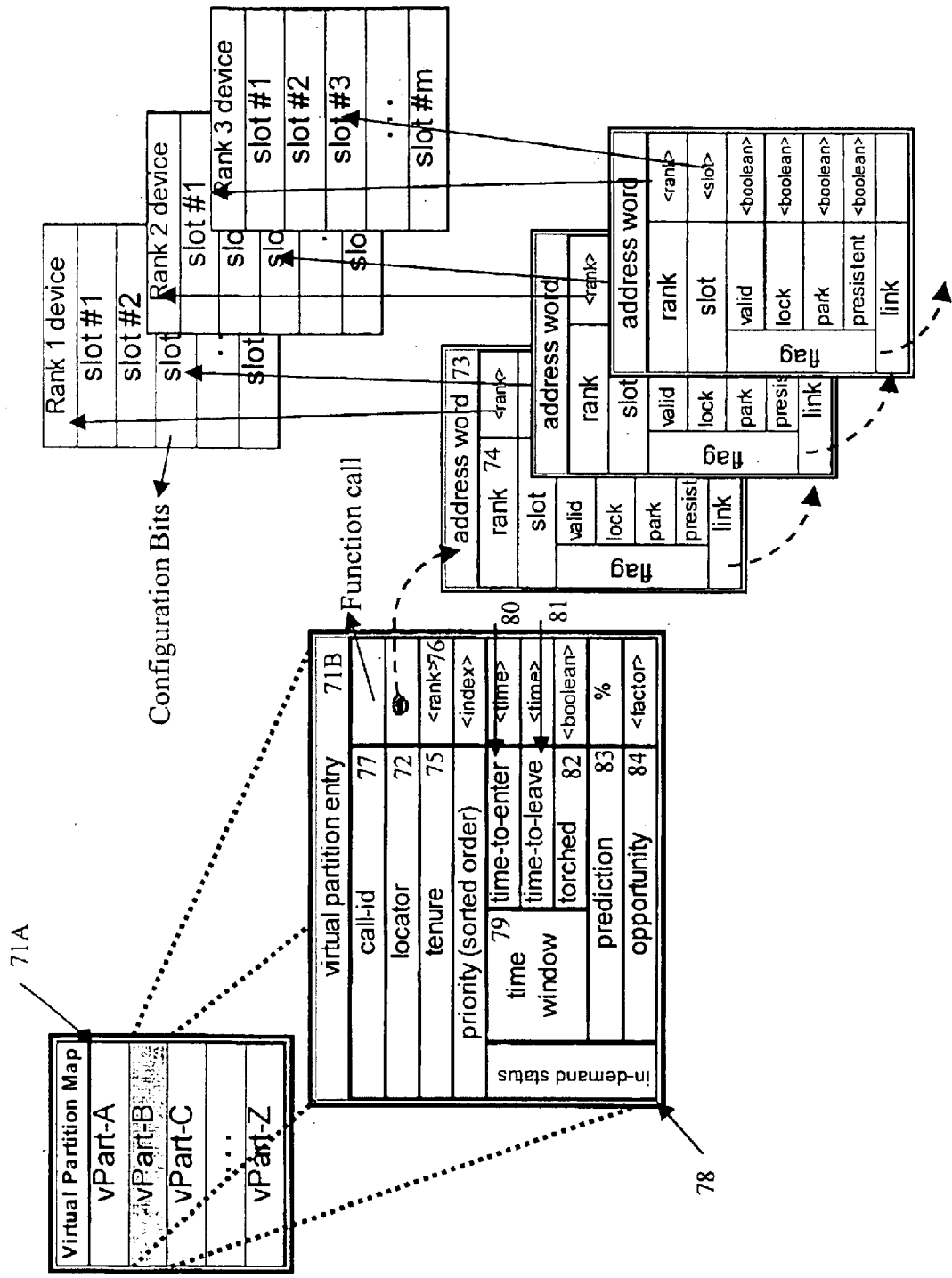
FIG. 8 shows the schematics of a VPM (Virtual Partition Map)

As shown in FIG. 7, FCT 62A has one entry 62B per each Function Call (Func-A, Func-B, . . . etc.) in a given software program. In a general case, a Function Call may include one or more Fabric Calls; a Fabric Call may utilize one or more Partitions; and each Partition may consist of one or more repetitive tiles of Reconfigurable Logic Fabric. In an exemplary embodiment of the present invention, every Partition is of identical shape and size; and all Fabric Calls within a Function Call are scheduled together, even though a Fabric Call may be invoked in multiple instances of Function Calls.

Each FCT entry 62B portraits the execution behavior of the associated Function Call, as shown in FIG. 7, providing key information in the following fields:

next-calls (63)—the linked list (using the "list pointer" field 64) of probable next Function Calls following current call, each node in the list contains the following information:

next-call-id (65)—the identification of the probable next-call,
probability (66)—the probability of actually being called next,
time-gap (67)—the separation in time between the two calls in succession;
speed-up (68)—the performance gain factor of the function in Hard Execution (Fabric Partitions involved) vs. Soft Execution (Fabric Partitions not involved);
hard-duration (69)—the length of time in Hard Execution;
macro-set (70)—the list of the included Fabric Calls, presented in the form of their corresponding VPM indices.

This data is used to schedule Function Calls, lining up the associated Virtual Partitions in pace with their probable times of invocation. The list of next-calls 63 implements a variation of branch prediction, where prediction is drawn on an empirical and adaptive basis. The speed-up 68 and hard-duration information 69, on the other hand, provide the basis for (Soft vs. Hard Execution) tradeoff evaluation. The macro-set 70 tells where to look for the Fabric Calls included and indexes to the VPM.

FIG. 8 shows the second system table Virtual Partition Map (LPS) 71A which has an entry 71B for every unique Fabric Call (vPart-A, vPart-B, . . . vPart-Z) in the software program. Each entry, as shown in FIG. 8, contains the following fields:

locator 72—points to the address word 73 at its present rank 74.
tenure 75—shows the desired rank 76 for its sequent movement.
call-id 77—links back to Function Call in the FCT.
in-demand 78—tracks in real-time, for scheduling purpose, the in-demand status anticipated for the specific Partition:
time-window 79—provide the upper and lower bounds of the time of need:
time-to-enter 80—the anticipated earliest time of activation
time-to-leave 81—the anticipated latest time of deactivation.
touched 82—a flag that is reset at the beginning of Demand Look-Ahead
prediction 83—sums up, over all probably threads of Function Calls, the composite Probability of being activated within the time window.
opportunity 84—similar to prediction, sums up the composite payback that can be anticipated from Hard Execution.

Also shown in FIG. 8 is the linking information of the physical location of the Configuration Bits in the staging memory devices. For instance, as shown in FIG. 8 there are three devices, e.g., Rank 1 device, Rank 2 device, Rank 3 device, each showing the number of the slot location in the ranked devices (i.e., slot #1, slot #2 . . . , slot #m).

Statistical Modeling of Function Calls

In one exemplary embodiment of the present invention, the two system tables are pre-initialized based on benchmark data. A profiling method such as described in U.S. Pat. No. 5,966,534, can be used to analyze the benchmark data for patterns and statistics on the activation sequence of Function Calls (FIG. 3). In another embodiment of the present invention, no analytical profiling is required. Instead, the system simply tracks over a history of benchmark runs what Function Calls are most likely to be called next following the activation of a given current Function Call. The established pair-wise statistical relationship between the current and the next-call Function Call is stored in a corresponding FCT entry as shown in FIG. 7.

This Statistical Model is the basis for "ranking" the tenure of all Virtual Partitions within the next stretch of time following the activation of a specific Function Call. Any rare cases next-call can be ignored in this method without causing a concern over program stall or system throughput degradation. The Model can be kept compact; at the same time, the profiling method is simplified.

The Statistical Model is loaded from a database at initialization time. In one embodiment, several such Models are prepared, each corresponding to a particular path or phase in a software program. During the course of its execution, a software program may switch to an alternative Statistical Model via a Load-Function-Call-Table statement, devised specifically for such a purpose. This type of arrangement can improve the relevancy of the Models, since their statistic contents are generated with more precise and narrowed focus. Arrangement as such allows manual fine-tuning of the system for optimal throughput.

Adaptive Modeling of Function Calls

Statistical Models alone have limitations. Statistics, if kept static, can miss peak-and-valley situations and steer the scheduling inadequately. In the present invention, quantities such as hard-duration, time-gap, and next-call probabilities are adjusted dynamically, adapting to the latest history. In the current invention, the calculations for adaptive adjustments are kept simple to minimize overhead. One exemplary adaptive algorithm of such is described below:

Let reduction fraction f=1/n, where n is an empirical and real number equal or greater than 2, specified by the user.

The adaptive evaluation for the hard-duration can be expressed as:

$$\text{Hard-duration} \leftarrow \text{Hard-duration}*(1-f) + \text{latest Hard-duration}*f \quad (2)$$

Hard-duration is re-evaluated at the end of a Function Call. Likewise, at the beginning of a Function Call, time-gap is updated with the latest data as follows:

$$\text{Time-gap} \leftarrow \text{Time-gap}*(1-f) + \text{latest Time-Gap}*f \quad (3)$$

At the same time, Probability values for the next-calls to follow the current Function Call are re-evaluated as follows:

```
Initialize R to 1;
For (all i in the next-calls) {
    probability(i) <- probability(i)* (1 - f);
    R <- R - probability (i);
    probability (current-call) <- probability (current-call) + R
}
```

The calculations above can be further simplified by taking out the second equation and replacing R in equation (4) with the constant f The calculation of R, however, is necessary to keep numerical round-off in check, when integer arithmetic is used. When restricting n to a binary whole number (n=2, 4, 8, . . . ), in one exemplary embodiment, the above adaptive algorithm can be efficiently implemented in hardware, replacing multiplication with binary shift operations.

Scheduling Schemes

Under the methods devised in the present invention, the scheduling for the execution of Function Calls in reconfigurable fabric is synthesized into the staging of Virtual Partitions through a pyramid of storage slots (FIG. 4) such that they would be ready in place when the software program calls their number. The bulk of processing for staging is done in the background, when the embedded processor is free and would otherwise be idle. The system overhead is, thus, kept to a minimum.

Figure 9B:
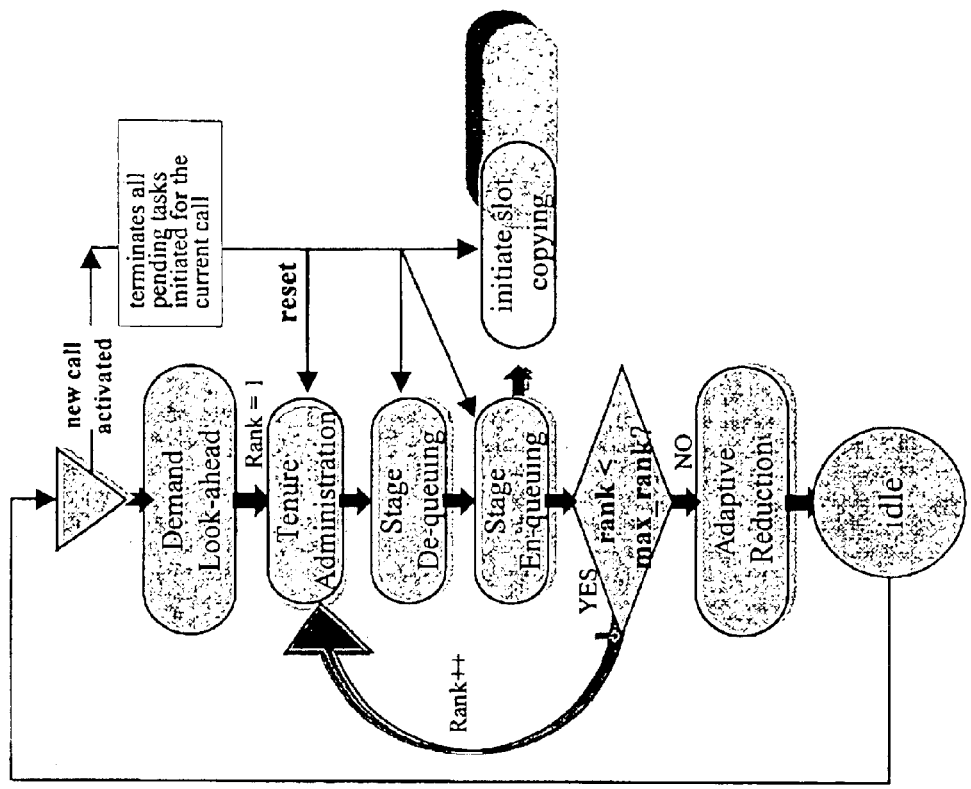
FIG. 9 shows the incremental tasking of the scheduling processes.
Figure 9A:
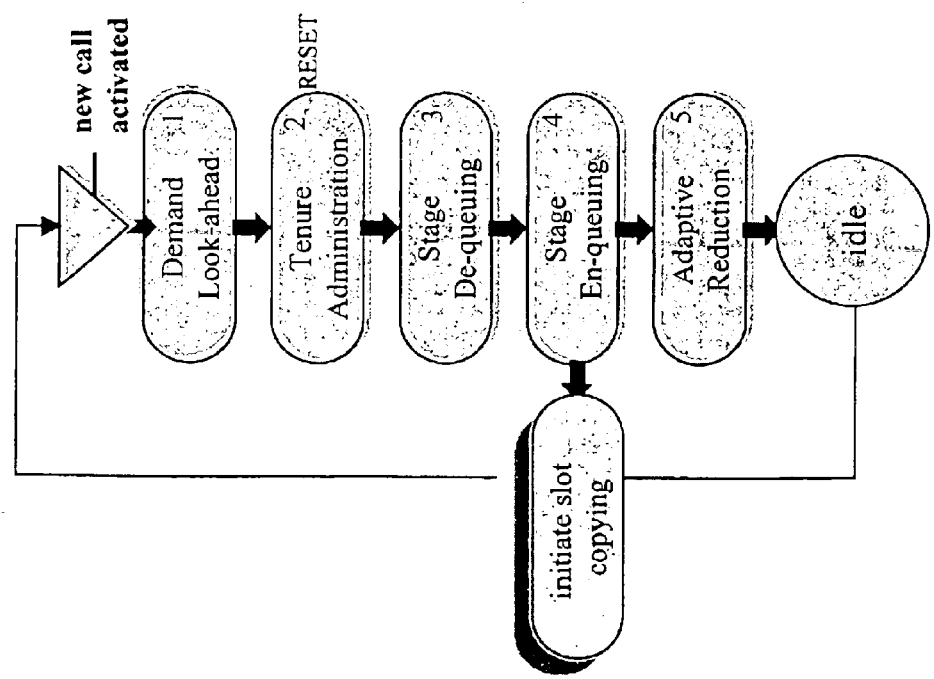

In the present invention, the scheduling tasks are broken up into six concurrent processes, five of which are shown in FIG. 9A. These processes, communicate only through the FCT and VPM system tables and run independently in the background whenever the embedded processor is freed up. They are invoked upon specific events through either an interrupt or a message polling mechanism. The interrupt or message polling mechanism, in turn, initiate common runtime service routines, kept in a Runtime Services Library, for system level tasks. For instance, in one embodiment, run time services routines include copying a Configuration Bit stream, activating a Fabric Partition, etc. The six concurrent processes are:

1. Demand Look-Ahead. At the event a Function Call is invoked in the software program, this process is triggered to re-evaluate demand status in the VPM, starting off from its list of next-calls registered in the FCT. By traversing the next-calls lists recursively, the system analyzes the demands several steps ahead, thus the availability of the Virtual Partitions can be staged more effectively.

2. Tenure administration. At the completion of Demand Look-Ahead, this process is invoked to upgrade the rating in tenure of all Virtual Partitions. The heuristics used in the rating could be scripted by users.

3. Stage De-Queuing. The De-Queuing process relieves storage slots from top rank down, one rank at a time, where their current tenant's tenure can no longer justify its rank. The address words of the relieved staging slots are returned to the "available" list of the rank, the locator of the Virtual Partition is backtracked to the previous address word.

4. Stage En-Queuing. The En-Queuing process allocates from an available list, one rank at a time, stage slots for Virtual Partitions with tenure higher than its rank. The allocated slot is now linked on top of the new tenant's locator with the corresponding valid flag turned off. At this time, a request is issued to a runtime service routine to have the contents copied over to the scheduled stage from its current location. At the successful completion of the copying, the valid flag is turned back on.

5. Adaptive Reduction (of the call history of the current Function Call). In the event a Function Call is concluded, the adaptive algorithm described above is applied to update the statistics in the FCT for the current function. At the same time, the next-call relationship between this and the previous Function Call is updated, or established if not previously included.

6. Global Fine Tuning: This process is initiated periodically to analyze the overall performance of the system, e.g. hit-to-miss ratio for Hard Executions, slot utilization of staging devices, system overhead, etc., and adjust the greediness parameters in various algorithms accordingly.

In one embodiment of the present invention, invocations of processes such as Tenure Management, Stage De-Queuing, and Stage En-Queuing are set up to execute progressively in finer steps, called incremental tasking. In this scheme, as shown in FIG. 9B, the process trio runs in a loop, stepping through the stages or levels of the pyramid one rank at a time. This finer division of scheduling tasks improves system efficiency.

1) Demand Look-Ahead

Figure 10:
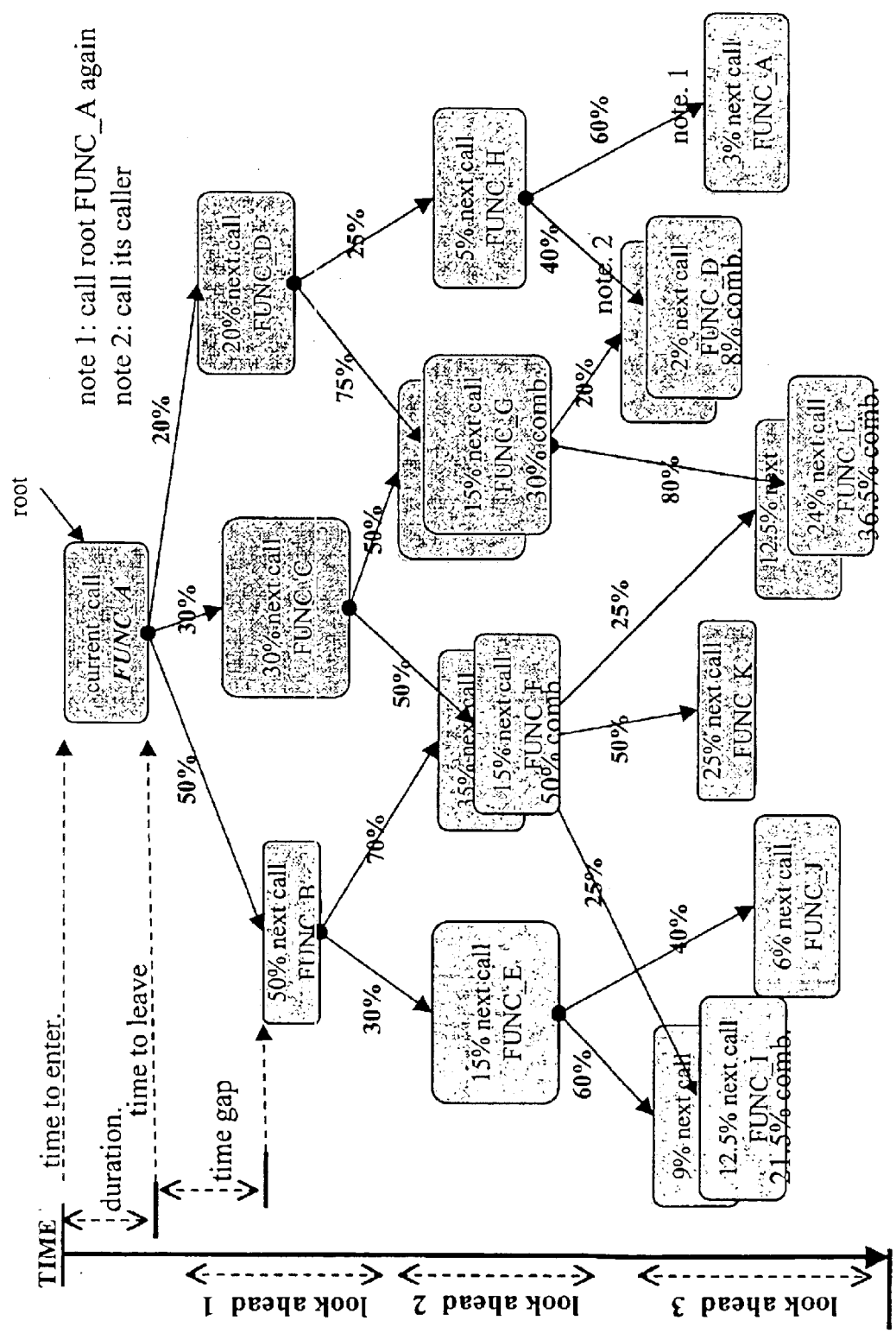
FIG. 10 shows an example of a next-calls fanout tree.

In a preferred embodiment of the scheduling method, the staging of Virtual Partitions is orchestrated by an implementation of Demand Look-Ahead. Basically, the system explores the next-calls lists 63 (FIG. 7) to the K-th recursion starting from the current function, to access the demands on Virtual Partitions K steps ahead. K is referred to as the look-ahead depth, it is one of the parameters that the user may use to control the greediness of the scheduling algorithms. The fan-out tree of next-calls shown in FIG. 10 illustrates traversing the next-calls lists to K-th recursion. Every trace from the root (i.e. the current function, Function A) to a given node (not just leaf nodes) in the tree forms a thread, which relates a next-call relationship in n (1 n K) steps remove between the node (at the end of the trace) and the root. A thread is said reachable, if the lead-time of each Virtual Partition involved is within its anticipated time of need. The lead-time of a Virtual Partition equates to the staging latency at its rank.

For each possible thread, the compounded scores of the next-call statistics, namely, time-gap, probability, and speed-up (those kept in FCT), are evaluated. The composite scores over all reachable threads to a given Virtual Partition are kept in VMP as are the corresponding time-window, prediction, and opportunity. Notice that a given Virtual Partition may be reached via multiple threads, and even from itself In one exemplary embodiment, the evaluation of the time-window is described as follows in C-like syntax:

```
DEFINE time-of-need_i = time-of-need_{i-1} + duration_i + time-gap_i
DEFINE duration_i = (reachable ? hard-duration: hard-duration* speed-up)
DEFINE reachable_i = (time-of-need_{i-1} + time-gap) > lead-time_i
DEFINE lead-time_i = staging-latency[node_i -> rank]
node TRAVERSE (thread, j) /* a recursive function */
{
    last-node = top-of-stack(thread)
    next-list = last-node -> next-calls in FCT
    for each (node in next-list) {
        j = j + 1
        push node into thread
        If (j < K) node = TRAVERSE(thread, j)
        VP-list = node -> macro-set in FCT
        for each (virtual-partition in VP-list) {
            if (reachable == false) continue
            if (touched == true) {
                touched = false
                time-to-enter = time-of-need
                time-to-leave = time-of-need + duration
            } else {
                time-to-enter = MIN(time-to-enter, time-of-need)
                time-to-leave = MAX(time-to-leave, time-of-need +
                    duration)
            }
        }
        pop node out of thread
        j = j - 1
    }
    return last-node
}
void main( )
{
Stack thread = { root-node }
integer j = 0
    reset time-window touched flags
    if (TRAVERSE(thread, j) != root) error-exit
}
```

In the description above, it is more aggressive to evaluate the time-to-enter and time-to-leave independently. Alternatively, $$\text{time-to-leave} = \text{time-to-enter} + \text{duration} \quad (5\text{-}1)$$

Similar, the prediction is scored as the sum over reachable threads of the compounded probability along the thread, and opportunity the net expected payback, as follows:

$$\text{prediction} = \Sigma_{Reachable\ Threads}\ (\Pi_{nodes\text{-}in\text{-}thread}(\text{probability})) \quad (6)$$

$$\text{opportunity} = \text{prediction}*(\text{speed-up}-1)*\text{hard-duration} \quad (7)$$

For a more elaborated look-ahead scheme, two additional analyses may be incorporated. Firstly, there is a possibility of conflict of opportunity. That is, a partition occupying critical storage slots, e.g. Configuration Cache, may block out a next-call partition from being reachable. This would be undesirable if the lost opportunity in the latter case out weighs the gain in the former case. This analysis is to impose a cost functions over critical staging resources. Secondly, the greediness of scheduling can be made to be adaptive to global statistics real time, such as staging slot congestion, percentage of schedule miss, etc.

2) Tenure Administration

In the present invention, at completion of Demand Look-Ahead, the system schedules an execution, referred as a task, of Tenure Management in a Task Request Queue (TRQ). Whenever the embedded processor is idle, the system wakes itself up, and invoke a task FIFO off TRQ. The Tenure Management process sorts in ascending order the entries in VPM to a priority-ordered list. The sorting is based on a figure of merit, calculated off a generic weighting function as follows:

$$\text{merit} = a/(\text{time-to-enter}-\text{time}(\ )) + b*\text{opportunity} + c*\text{prediction}$$

A scripting mechanism can be provided to allow users specify the co-efficiencies a, b, and c, or even define their own weighting function. In practice, motivated by keeping system overhead minimal, only one of the triple variables (a, b, c) is set with a non-zero value. For example, when (a, b, c) is set:

(1, 0, 0): the order is temporal, reflecting the urgency of a Hard Function in demand.

(0, 1, 0): the order is probabilistic, reflecting the certainty of a Hard Function being called soon.

(0, 0, 1): the order is opportunistic, reflecting the potential of gain in system throughput.

All these orderings are assumed to be ascending. In one embodiment of the present invention, all three orderings described about are prepared. Different algorithms use a different ordering that makes best sense. For example, it makes sense to process tenure in temporal order, since the demands at the top of queue need to be looked at first. Similarly, probabilistic ordering makes sense for Stage De-Queuing, since resources least likely needed ought to be freed up first. Likewise, opportunistic ordering makes sense for Stage En-Queuing, since the ultimate goal is to improve the system throughput. Moreover, the ordering chosen for each algorithm can be specified by users, so as to work out empirically a best strategy for the underlying software program.

At the prescribed ordering, the tenure of a given Virtual Partition is set according to the just-in-time principle, i.e. to the rank that satisfies the inequality in Equation (1). In one embodiment of the present invention, in conjunction with the notion of incremental tasking described above (shown in FIG. 9B), tenures are processed as follows:

```
for (rank = 1, count = 0, j = 0; j < # of partitions; j++) {
    vp = temporal-order[j]
    if (time-to-enter[vp] < staging latency [rank+1] {
        tenure [vp] = rank
        count = count + 1
    } else {
        wake-up Stage De-Queuing (rank, count)
        wait (completion of Stage En-Queuing (rank))
        rank = rank + 1
        if (rank >= rank of the persistent stage) exit
        count = 0
    }
}
```

3) Stage De-Queuing

The De-Queuing process examines if there are enough free slots, at a given rank, to accommodate the all Virtual Partition at a specific tenure. When free slots are fewer than needed, the following actions are taken to match supply with demand:

Checking from a linked list maintained per each stage device, any slot, whose tenant (Virtual Partition) is with a time-to-leave being less than the wall clock time, is freed up. The current tenant is therefore demoted to the next rank.

If more slots need to be found, check from the same list to free up any slot whose tenant having a time-to-enter being zero or greater than the wall clock time. This de-allocates slots no longer in need. If still more slots need to be found, the demand side is suppressed to match the supply. This is done by dropping Virtual Partitions from tenure promotion in accordance with the probabilistic ordering.

The De-Queuing process is active when triggered by the Tenure Management process. The En-Queuing process is then subsequently triggered when the De-Queuing process frees up sufficient slots for new tenants. When incremental tasking is incorporated, the execution of processes 2, 3, and 4 shown in FIG. 9A is iterated on a per rank basis.

4) Stage En-Queuing

The En-Queuing process, traversing the VPM in ascending opportunistic ordering, promotes Virtual Partitions whose rank is lower than its tenure up a rank above its current rank. The Promotion is done by allocating a free slot in a next rank and initiating a proper channel program, e.g. DMA channels, to copy the Configuration Bits over to the newly allocated slot. The copying is done in the background in the mix of other scheduling tasks. At the completion of copying, the channel program marks the copy in the new slot as valid.

In cases where a Virtual Partition has a tenure more than one rank above its current rank, the En-Queuing process is re-iterated multiple times to accomplish the full promotion. However, with sufficient depth in the look-ahead process, this re-iteration is, in general, unnecessary. The staging of a Virtual Partition is generally initiated soon enough, where promotions of more than one rank should not be needed at a time. Re-iteration, however, can be forced by users as one of the greediness options that a user can choose.

When incremental tasking is in effect, as an alternative exemplary embodiment, the re-iteration is enabled by default, however, the procedure involved is modified slightly. The En-Queuing process is iterated (as illustrated in FIG. 9B) from top to bottom, rank by rank. At each iteration, the process looks to promote Virtual Partitions with tenure higher than both the rank of iteration and its current rank. This means that the En-Queuing needs are examined from the top rank down to a rank of the iteration at each iteration. While the promotion is still being done one rank at a time, a Virtual Partition has the chance to eventually be fully promoted. For instance, a Virtual Partition currently at rank 4 and with a tenure 2 will be copied to rank 3 at iteration 3, then to rank 2 at iteration 4. This procedure is superior since it is as greedy as time would permit. If the execution of the current Function Call lasts long enough, sufficient free time of the embedded processor will be available to complete the incremental tasking. However, if the tasking procedure gets terminated prematurely, as it would be at the beginning of a next Function Call, the unfinished portion of the tasks are always the less significant portion. The partial result is usable and effective.

5) Adaptive Reduction

At the conclusion of a Function Call, the statistic entries: hard-duration, time-gap, and probability, in FCT for the call prior to the current call are updated based on the Adaptive Reduction scheme described above (refer to Equation (2), (3) and (4) for details). The statistics are thus changed and adapted to current execution patterns. In addition, the following actions take place:

A probable next-call listed with a given Function Call will be dropped from the list, if miss the call frequent enough, when the associated probability is reduced below a threshold. The current call will be added to the next-calls list if it is not there already.

Optionally, the system will monitor and log system efficiency in items such as: hit-to-miss ratio for Hard Execution, congestion factor in each staging device, Optionally, the time-windows are reset for the current next-call tree (details are given in below).

Up until now, for simplistic reason, the discussion so far implies that only one Function Call is active at a given time. Although this could still be the case for certain software programs, it is, in general, not a reasonable assumption. For one thing, the partitions of Reconfigurable Logic Fabric can run independently of either other, thus, allowing multiple channels or parallel processing. For another, a compiler, employing techniques such as loop unfolding and others, can optimize performance by setting up parallel threads of code execution in the reconfigurable fabric.

As the consequence, we need to consider multiple Function Calls being active concurrently. When this is this case, multiple next-call fanout trees, one proliferated from the active call, are maintained in parallel. The schemes described so far in the present invention supports Concurrent Function Calls as well, needing only a few minor modifications.

In the present invention, scheduling, or rather staging, of Virtual Partitions is divided up in incremental and self-contained units. Multiple instances of each of those units can be fired up simultaneously from different fanout trees. Each of these instances is managed as a task in a multi-tasking environment. A TRQ is set up to "pipeline" the execution of these scheduling tasks. Each of the concurrent calls can stack a series of tasks into the queue, and the system will pull them out of the FIFO. The tasks refer to the same FCT and VPM system tables. It should be understood that some mechanism must be provided to prevent these tasks from interfering with each other.

In one embodiment of the presentation invention, concurrent Function Calls are supported with additional provisions as follow:

The time windows in VPM are not reset in the event a Function Call becomes activated. Instead, at the conclusion of a Function Call, the fanout tree proliferated from the call is traversed again to have the corresponding fields of time windows reset.

Semaphores are employed to provide a lock mechanism that serializes the updates made to each and any FCT and VPM entries.

A new field called tree-id mask is added to VPM, which allows each concurrent call to mark its own fanout tree using one bit of the mask. e.g. A 32-bit mask can support up to 32 active concurrent calls. Meanwhile, a Virtual Partition common to, for instance, two trees will have two of the bits turned on corresponding to the tree-ids.

Facilitated by the tree-id mask, the system can maintain one set of temporal, probabilistic, and opportunistic orderings for each concurrent call.

6) Global Fine-Tuning

In one enhancement embodiment of the present invention, a Global Fine-Tuning task is initiated by the system periodically to self-evaluate the systems own efficiency, and adjust accordingly the greediness of the processes involved. Some exemplary Global Fine-Tuning schemes are as follow:

The system can increment the look-ahead depth when the hit-to-miss ratio is below a lower bound, and decrement when device congestion is above a upper bound.

The system can adjust the reduction factor f used in Equation (2) to (4) automatically based on the hit-to-miss ratio.

The system can maintain the next-calls statistics kept in FCT, namely, hard-duration, time-gap, and speed-up, in a pair of bounds.

The system can adjust automatically the percentage point these values are referred.

Self Training Mode

In the present invention, all facilities enable a system being brought up cold with no initial Call History Model, and work its way to establish the Statistical Model on-the-fly. This capacity allows the system to support a Training Mode, where more details are analyzed and more history logged, at the expense of running at a slower pace. In one embodiment, the option of parallel (Hard and Soft) Function Call executions is turned on in Training Mode to allow evaluation of speed-up factors. In an exemplary embodiment of the Self Training Mode, the following additional analysis and history keeping are included:

The frequency of Global Fine-Tuning evaluation is increased. The statistics are generated over a history not just an instance. This means an audit trail is maintained for each pair of consecutive Function Calls, and the statistics kept in FCT are evaluated form this audit tail each time.

The system can dump a snapshot copy of the Model to a secondary storage medium, and retrieve it back as an initial Model, or to continue the self training process.

In addition, the system can maintain profiling statistics covering the Soft Executions, which can give hints on additional Hard Functions.

In the preceding description, numerous specific details are set forth, such as specific system structures or elements in order to provide a thorough understanding of the present invention. It will be apparent, however, to one skilled in the art that these specific details need not be employed to practice the present invention. In, other instances, well known computing system elements or computing system processing have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

I claim:

1. A method of scheduling function calls in a software program in a dynamically reconfigurable computing system which includes an embedded processor and a finite number of reconfigurable logic partitions which are each programmed by a set of configuration bits dynamically loaded into the system's configuration memory, the method comprising the steps of:

a) processing each function call identified within the software program into both a hard implementation for hard execution in said reconfigurable logic partitions wherein a set of configuration bits associated with said each function call is generated and into a soft execution in said embedded processor;

b) assigning each set of said configuration bits generated during said hard implementation to a virtual partition;

c) constructing a call history model including statistical data characterizing the patterns in calling sequence of each function call in said software program obtained from benchmark data and initially using the call history model upon invocation of said software program;

d) employing a hierarchy of storage devices to form a pyramid of staging slots for the purpose of storing and moving each virtual partition from its initial memory location in said hierarchy of storage devices having the longest associated access latency to said configuration memory on a "time-of-need" basis;

e) constructing a virtual partition table of statistical data to track and allocate said staging slots for the purpose of staging said virtual partitions within said pyramid, wherein prior to execution of said software program all virtual partitions are assigned to staging slots having said longest associated access latency, and wherein, while executing said software program, virtual partitions are moved to staging slots within said pyramid having either shorter or longer access latencies on said "time-of-need" basis dependent on said statistical data within said virtual partition table;

f) upon the invocation of a current function call while executing the software program, activating hard implementation of said current function call if its associated virtual partition is located within said pyramid in a position ready for activation, otherwise activating soft implementation of said function call;

g) during activation of the current function call, utilizing said call history model to determine probably next function calls to follow the current function call;

h) during activation of the current function call, simultaneously initiating dynamic scheduling tasks to facilitate said staging of said virtual partitions through the hierarchy of storage devices dependent on said patterns in call sequence indicated in said call history model;

i) upon the completion of activation of the current function call, dynamically updating said statistical data associated with the current function call in said call history model using statistical data obtained during the execution of the current function call;

j) repeating steps (f) to (i) for said each function call until termination of execution of said software program.

2. The method as described in claim 1 wherein said step of processing each function call identified within the software program into both a hard implementation and a soft implementation comprises the steps of:

inserting within said software program a first pair of code statements for identifying blocks of code corresponding to each function call, bounding each said block of code with a start statement in the front and an end statement at the end;

further inserting within each said block of code a second pair of code statements identifying sub-blocks of cods within each of said block of code targeted to be executed in said reconfigurable logic partitions, each sub-block of code having an associated function performable within said reconfigurable logic partition;

transcribing said associated function of said each sub-block of code to generate each of said sets of configuration bits which, when leaded into the configuration memory of said reconfigurable computing system, causes one or more of the said reconfigurable logic partitions to perform said associated function of said each sub-block;

compiling a first code corresponding to said soft implementation and a second code corresponding to said hard implementation, wherein said first code is executed in said embedded processor, and wherein said second code is executed such that said configuration bits corresponding to said each sub-block of code is transferred to said reconfigurable logic partitions for execution;

assembling said first and second codes and configuration bits to form an executable code for said software program.

3. The method of scheduling function calls as described in claim 1 further comprising the step of including within said virtual partition table a plurality of entries corresponding to each function call and associated virtual partition, each entry including:

a local pointed to a linked list of address words each for locating said associated virtual partition within said pyramid;

a tenure value entry showing a desired rank for said associated virtual partitions;

call-id entry for linking back to said associated virtual partition's function call;

in-demand entry for tracking anticipated demand for said virtual partition;

a time window entry providing the upper and lower bounds for said "time-of-need";

a time-to-enter entry providing the earliest time of deactivation of said virtual partition;

a time-to-leave entry providing the latest time of deactivation of said virtual partition;

a prediction entry which sums up a composite probability of being activated within said upper and lower bounds of said tide window; and a opportunity entry which sums up a composite payback value that can be anticipated firm executing said virtual partition in said hard execution.

4. The method of scheduling function calls as described in claim 3 further including the step of storing along with each of said address words:

a rank and slot entry indicating the location of said virtual partition within a given storage device of said pyramid; and access control flags defining memory access privileges of said location of said virtual partition within said hierarchy of storage devices.

5. The method of scheduling function calls as described in claim 1 wherein said step of constructing said statistical call history model further comprises creating a function call table including a plurality of entries corresponding to each function call, each function call entry including:

a pointer to a linked list of probable next calls entries;

a speed-up factor corresponding to a performance gain factor of said each function call executed in hard execution;

a hard-duration time corresponding to the length of time to execute said each function call in hard execution;

a macro-set pointer which points to a linked list of virtual partition identifiers associated with said function call.

6. The method of scheduling function calls as described in claim 5 further comprising the step of including within each probably next call entry:

a probable next-call id;

a list pointer to a next probable next-call in said list of probable next-calls;

a probability factor of said probable next-call;

a time-gap corresponding to the separation in time between two calls in succession.

7. The method as described in claim 1 wherein said step of initiating dynamic scheduling tasks includes the step of performing a demand look-ahead task comprising the steps of:

recursively traversing next-calls lists including a list of said probable next function calls in said call history model a predetermined number of (k) times to establish a tree of next-calls that is to follow said current function call, wherein k is defined as a look-ahead depth;

and predicting said "time-of-need", a probability factor, and an expected payback factor, for each of said next-calls in said tree.

8. The method as described in claim 7 wherein, upon completion of said demand look-ahead task, said step of initiating dynamic scheduling tasks further including the step of prioritizing said virtual partitions associated with each of said next-calls in said tree into three orderings including a temporal order based on said "time-of-need", a probabilistic order based on said probability factor, and an opportunistic order based on said expected payback factor.

9. The method as described in claim 8 wherein, upon completion of said prioritizing said virtual partitions, said step of initiating dynamic scheduling tasks further including the step of performing a tenure management task comprising the steps of:

determining, a tenure value of said each of said virtual partition associated with function calls included in said next-calls tree, said tenure value corresponding to a desired staging slot position of said each virtual partition within said pyramid, said desired staging slot position being dependent on a "just-in-time" principle based on said associated latency of said staging slot position;

wherein said tenure management task establishes a tenure value that is "just-in-time" with respect to said "time-of-need".

10. The method as described in claim 9 wherein, upon completion of said tenure management task, said step of initiating dynamic scheduling tasks further including the step of performing a stage de-queuing task comprising the steps of:

freeing up sufficient ones of said staging slots within said pyramid to accommodate a number of slots needed as the result of a change in tenure value determined during said step of performing said tenure management task.

11. The method as described in claim 10 wherein, upon completion of said stage de-queuing task, said step of initiating dynamic scheduling tasks further including the step of performing a stage en-queuing task comprising the steps of:

allocating free staging slots within said pyramid to said each virtual partition when its rank is lower than its tenure value;

moving by copying said virtual partitions into said free staging slots.

12. The method of scheduling function calls as described in claim 1 wherein said hierarchy of storage devices include hard disk, system main memory, dedicated external SRAM, dedicated on-chip buffer memory, and on-hip Configuration Cache.

13. The method as described in claim 1 further comprising the step of storing said each set of configuration bits assigned to each virtual partition into more than on staging slot, and chaining together said more than one staging slots with address words.

14. The method as described in claim 13 further comprising the step of managing the storing of virtual partitions within said staging slots using flag fields associated with said address words.

15. The method as described in claim 14 wherein said flag fields include:

a valid field for indicating the validity of said set of configuration bits copied into said staging slot;

a lock field for prohibiting freeing-up of said staging slot;

a park field for indicating a given level within said pyramid in which said method of scheduling no longer controls movement of virtual partitions within said pyramid of staging slots and instead said movement is controlled by another computing system control mechanism; and a persistent field for indicating said staging slot should never be reassigned a new virtual partition.

16. The method as described in claim 7 wherein said demand look-ahead task further comprises the step of determining a composite probability factor for a sequence of more than one probable next-call.

17. The method as described in claim 11 further comprising the steps of:

incremental tasking of said dynamic scheduling tasks such that said dynamic scheduling tasks are recursively performed on a rank-by-rank basis; and interrupting said incremental tasking any time a new function call is activated wherein the most critical iterations of said dynamic scheduling tasks are accomplished for scheduling of said next function call.

18. The method as described in claim 11 wherein a global fine tuning process is employed to automatically adjust greediness of computational algorithms used to perform said dynamic scheduling tasks.

19. The method as described in claim 18 wherein said computational algorithms are formulated with simple linear computational relationships which can be weighted by a reduction fraction (f) and a balance of said reduction fraction (1−f), based on recent and historical statistical data in said function call history model.

20. The method as described in claim 1 further comprising the step of scheduling said function calls by performing a training mode, said training mode comprising the steps of:

by-passing said call history model based on benchmark data;

upon invocation of said each function call during an initial software program run-time, activating both said hard implementation and said soft implementation of said each function call;

constructing a call history model with statistical data logged relating to said hard implementation and soft implementation of said each function call during said initial run-time; and upon subsequent invocations of said each function call, dynamically updating said call history model constructed during said initial run-time, wherein said call history model is constructed on-the-fly during software program run-time.

21. A method comprising:

analyzing a computer software program to identify subset(s) of the computer software program that could be implemented by (re)configuring reconfigurable logic to perform the identified subsets in hardware in a dynamically reconfigurable logic device; and selectively (re)configuring the reconfigurable logic within the reconfigurable logic device during run-time of the software program to implement one or more of the identified subset(s) of the computer software program.

22. A method according to claim 21, further comprising:

implementing the non-identified subset of the computer software program as software executable by an embedded processor within the dynamically reconfigurable logic device.

23. A method according to claim 22, the element of selectively (re)configuring the reconfigurable logic comprising:

employing a hierarchy of storage devices to form a pyramid of staging slots to store and move virtual partition(s) from an initial memory location having a longest access latency to a configuration memory as a time to implement an associated configuration approaches; and upon the invocation of a current function call while executing the software program, activating a hard implementation of the current function call if its associated virtual partition is located within the pyramid in a position suitable for activation, otherwise activating a soft implementation of said function call.

24. A method according to claim 21, the element of analyzing comprising:

identifying one or more function calls within the software program amenable to implementation in hardware by reconfigurable logic of the dynamically reconfigurable logic device.

25. A method according to claim 24, further comprising:

processing an identified function call into a hard implementation for hard execution in a subset of reconfigurable logic partitions of the reconfigurable logic, wherein a set of configuration bits associated with the function call is generated.

26. A method according to claim 25, further comprising:

assigning each set of said configuration bits generated during said implementation to a virtual partition.

27. A method according to claim 26, further comprising:

generating a call history model based, at least in part, on statistical data characterizing a pattern in calling sequence of identified function call(s) in the software program.

28. A dynamically reconfigurable logic device comprising:
   one or more embedded controllers; and
   one or more reconfigurable logic element(s), communicatively coupled with at least a subset of the one or more embedded controllers, the logic device to analyze a software program to schedule function calls, wherein select function calls are selected for hard implementation through (re)configuration of at least a subset of the one or more reconfigurable logic element(s) while other function call(s) are implemented in software by one or more of the embedded controller(s), and wherein the determination of whether a function call is implemented in hardware or software is made at runtime of the software program.

29. A dynamically reconfigurable logic device according to claim 28, wherein the one or more reconfigurable logic element(s) implement a fabric of reconfigurable logic partitions.

30. A dynamically reconfigurable logic device according to claim 29, wherein configuration(s) implementing a function call in hardware are initially stored in a virtual partition in a storage element until physical implementation in one or more partitions of the reconfigurable logic fabric.

31. A dynamically reconfigurable logic device according to claim 30, further comprising a hierarchy of storage elements, wherein a highest priority in the hierarchy is characterized by a low access latency while the lowest priority in the hierarchy is characterized by a high access latency relative to the highest priority in the hierarchy.

32. A dynamically reconfigurable logic device according to claim 31, wherein virtual partitions are promoted through the hierarchy of storage elements during runtime of the software program as a time to implement the associated function call draws near.

33. A system comprising:
   a dynamically reconfigurable logic device according to claim 28; and
   a non-volatile memory device, communicatively coupled with one or more of the embedded controller(s) and/or the reconfigurable logic element(s), to store one or more software programs for selective execution by one or more elements of the dynamically reconfigurable logic device.

* * * * *

UNITED STATES PATENT AND TRADEMARK OFFICE
CERTIFICATE OF CORRECTION

PATENT NO. : 6,871,341 B1
DATED : March 22, 2005
INVENTOR(S) : Shyr

It is certified that error appears in the above-identified patent and that said Letters Patent is hereby corrected as shown below:

Column 19,
Line 12, delete "cods" and insert -- code --.
Line 19, delete "leaded" and insert -- loaded --.
Line 57, delete "tide" and insert -- time --.
Line 60, delete "firm" and insert -- from --.

Column 21,
Line 17, delete "on-hip" and insert -- on-chip --.

Signed and Sealed this

Thirty-first Day of May, 2005

JON W. DUDAS
*Director of the United States Patent and Trademark Office*